US008313597B2

(12) United States Patent
Yang et al.

(10) Patent No.: US 8,313,597 B2
(45) Date of Patent: Nov. 20, 2012

(54) METHODS FOR ATTACHING THERMOPLASTIC PROFILE TO ROOFING MEMBRANE AND DUAL WELDING DEVICE

(75) Inventors: Li-Ying Yang, Whippany, NJ (US); Sudhir Railkar, Wayne, NJ (US); Yogesh Patel, Iselin, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 159 days.

(21) Appl. No.: 12/770,711

(22) Filed: Apr. 29, 2010

(65) Prior Publication Data

US 2011/0155321 A1 Jun. 30, 2011

Related U.S. Application Data

(63) Continuation-in-part of application No. 12/651,315, filed on Dec. 31, 2009, now Pat. No. 8,202,596.

(60) Provisional application No. 61/291,766, filed on Dec. 31, 2009.

(51) Int. Cl.
*B32B 37/00* (2006.01)
(52) U.S. Cl. .......................... 156/82; 156/497; 156/499
(58) Field of Classification Search .................... 156/71, 156/82, 304.1, 391, 497, 499, 544, 553, 574, 156/579
See application file for complete search history.

(56) References Cited

U.S. PATENT DOCUMENTS

| 4,440,588 A | 4/1984 | Stevenson et al. |
| 4,605,578 A | 8/1986 | Emrich et al. |
| 5,126,003 A | 6/1992 | Hassmann et al. |
| 5,729,944 A | 3/1998 | De Zen |
| 6,554,947 B2 | 4/2003 | Pfotenhauer et al. |
| 6,581,663 B2* | 6/2003 | Rubenacker et al. .......... 156/391 |
| 6,610,159 B2* | 8/2003 | Henegar .......................... 156/82 |
| 7,571,753 B2* | 8/2009 | Martinez ........................ 156/497 |
| 2002/0170254 A1 | 11/2002 | Ritland et al. |
| 2009/0169803 A1 | 7/2009 | Halahmi et al. |

OTHER PUBLICATIONS

PCT/US2010/062423, Search Report and Written Opinion of the International Searching Authority mailed Mar. 10, 2011.
PCT/US2010/062425, Search Report and Written Opinion of the International Searching Authority mailed Mar. 10, 2011.

* cited by examiner

*Primary Examiner* — James Sells
(74) *Attorney, Agent, or Firm* — Baker & McKenzie LLP

(57) ABSTRACT

Embodiments disclosed herein provide a novel and cost effective application of a thermoplastic heat-welding rod for welding thermoplastic standing seam profiles and other similar materials to thermoplastic roofing membrane, and providing secure attachment without roof penetration and profile/membrane separation. In addition, embodiments disclosed herein provide a welding attachment or apparatus for performing such heat-welding of thermoplastic materials. In one embodiment, an apparatus for welding a thermoplastic profile strip to a thermoplastic membrane may comprise a first nozzle configured to direct hot air along a portion of a first longitudinal edge of a horizontal base of a thermoplastic profile strip placed on a thermoplastic membrane. Also, such an apparatus may comprise a second nozzle configured to direct hot air along a portion of a second, opposing longitudinal edge of the thermoplastic profile strip. Furthermore, the apparatus may also comprise a tubular splitter configured to simultaneously supply hot air to the first nozzle and the second nozzle.

24 Claims, 8 Drawing Sheets

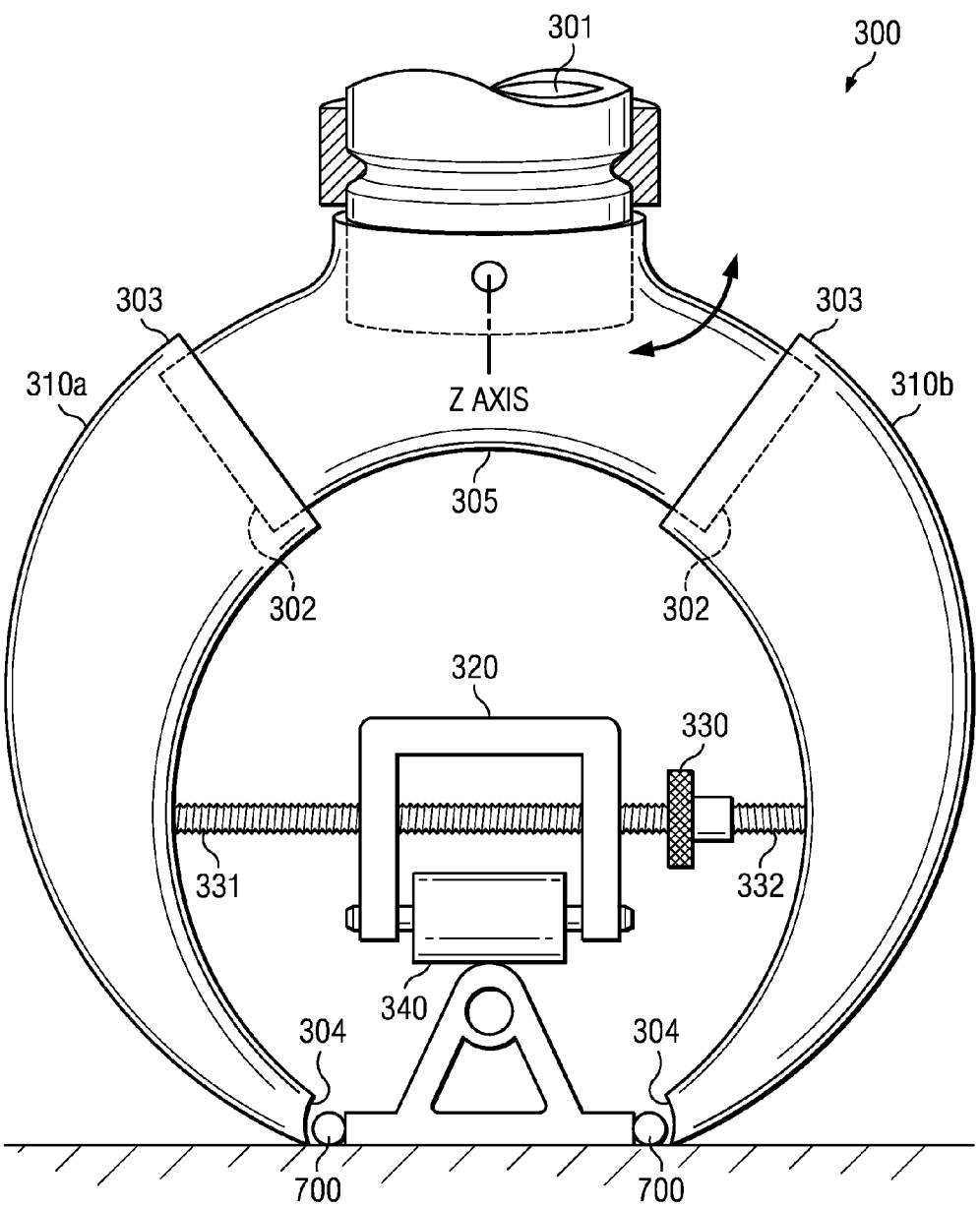
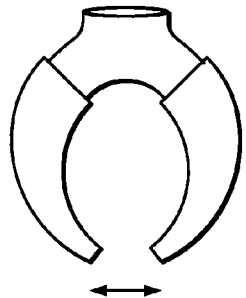
FIG. 3A
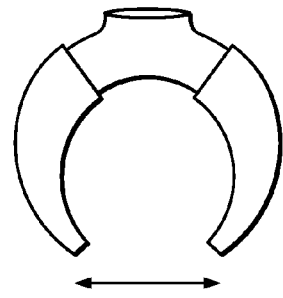
FIG. 3B
FIG. 3

METHODS FOR ATTACHING THERMOPLASTIC PROFILE TO ROOFING MEMBRANE AND DUAL WELDING DEVICE

RELATED APPLICATIONS AND PRIORITY CLAIMS

This application claims priority to U.S. Provisional Patent Application No. 61/291,766, filed Dec. 31, 2009, now U.S. Pat. No. 8,202,596 and claims priority to, and is a continuation-in-part of, U.S. patent application Ser. No. 12/651,315, filed Dec. 31, 2009. Both of these applications, and any from which they may claim priority, are incorporated by reference in their entireties for all purposes.

TECHNICAL FIELD

In accordance with the disclosed principles, a welding rod attachment for use with thermoplastic roofing membranes is disclosed, as well as related methods of welding thermoplastic materials.

BACKGROUND

Thermoplastic roofing membranes, such as polyvinyl chloride (PVC) and thermoplastic polyolefin (TPO), are a rapidly growing in market acceptance. Thermoplastic standing seam profiles are designed to add aesthetics to otherwise plain thermoplastic roofing membrane. The standing seam profile thermoplastic roof assembly resembles a standing seam metal roof with the advantages of true waterproof performance, lower installed cost, sound and hail resistance. It can be applied for broad roof shapes, especially for curved roof installation. To enhance the appearance of such roofs, thermoplastic standing seam profiles (SSP) have been secured to the thermoplastic membranes, sometimes by adhesive, and sometimes by the application of heat, all of which is done manually. One of the key success factors is the secure attachment of thermoplastic standing seam profile to thermoplastic membrane without roof penetration. Utilizing peel & stick adhesive tape technology is an easy and quick installation method. However, long-term tape attachment is a concern encountering uneven roof substrate and building movement.

Utilizing a heat welding machine or hand gun requires a wide and flexible thermoplastic profile flange for conventional roofing heat welding practice. An alternative is to use a customized heat welding apparatus which have means to overcome central upstanding profile and to weld thermoplastic standing seam profile to thermoplastic roofing membrane. Applying heat to permanently attach the profiles may require a welder that is large and cumbersome. For a steep sloped roof, this is especially challenging. Also, the roofer will be required to guide the system in a straight line to achieve a good appearance, while keeping the profile in place, and maintaining a balance on a sloped roof.

Extrusion welding is a manual welding process and as such, is dependent on operator skill. Unfortunately, manual application of the strips is a time consuming and labor intensive process, increasing the cost of the roofing and decreasing the cost advantage gained by selecting thermoplastic roofing over metal roofing. Manual application also increases opportunity for error and is not conducive to creating straight and/or parallel and/or equidistant lines.

Extrusion welders are designed to maximize weld quality by ensuring certain parameters are accurately defined, such as, temperature of the welding material (extrudate), mass flow rate of the welding material, temperature of the hot gas for substrate pre-heat, and quantity of hot gas. The speed of welding is dependent on the flow rate of the extrudate, the material thickness, the cross sectional area of the seam and the size and design of the welding shoe.

What is needed in the art is a quick and inexpensive apparatus and method of attaching thermoplastic strips to thermoplastic roofing membranes.

SUMMARY

Embodiments disclosed herein provide a novel and cost effective application of a thermoplastic heat-welding rod for welding thermoplastic standing seam profiles and other similar materials to thermoplastic roofing membrane, and providing secure attachment without roof penetration and profile/membrane separation.

In addition, embodiments disclosed herein provide a welding attachment or apparatus for performing such heat-welding of thermoplastic materials. In one embodiment, an apparatus for welding a thermoplastic profile strip to a thermoplastic membrane may comprise a first nozzle configured to direct hot air along a portion of a first longitudinal edge of a horizontal base of a thermoplastic profile strip placed on a thermoplastic membrane. Also, such an apparatus may comprise a second nozzle configured to direct hot air along a portion of a second, opposing longitudinal edge of the thermoplastic profile strip. Furthermore, the apparatus may also comprise a tubular splitter configured to simultaneously supply hot air to the first nozzle and the second nozzle.

In a more specific embodiment, an apparatus for welding a thermoplastic profile strip to a thermoplastic membrane may comprise a first nozzle configured to direct hot air along a portion of a first longitudinal edge of a horizontal base of a thermoplastic profile strip placed on a thermoplastic membrane, and a second nozzle configured to direct hot air along a portion of a second, opposing longitudinal edge of the thermoplastic profile strip. Additionally, this embodiment of such an apparatus may comprise a tubular splitter configured to simultaneously supply hot air to the first nozzle and the second nozzle, wherein the first and second nozzles further comprise corresponding guides for placing thermoplastic welding rods along the first and edges of the thermoplastic profile strip proximate to the portions of the first and second edges receiving the hot air simultaneously.

In other aspects, the disclosed principles provide for methods for welding a thermoplastic profile strip to a thermoplastic membrane. In one embodiment, such a method may comprise placing a thermoplastic profile strip on a thermoplastic membrane, where the profile strip has a horizontal base extending longitudinally and a first longitudinal edge and a second longitudinal edge opposite the first edge, wherein the thermoplastic membrane is in close proximity to the first and second longitudinal edges when the strip is placed on the membrane. Such an exemplary method may also comprise placing a first thermoplastic welding rod along a portion of the first longitudinal edge, and placing a second thermoplastic welding rod along a portion of the second longitudinal edge. Further, the method may include simultaneously directing hot air along the portion of the first longitudinal edge and along the portion of the second longitudinal edge, the directing being simultaneous with the placing of the first and second thermoplastic welding rods. In such embodiments, the hot air sufficiently melts the portions of the first and second edges and the first and second welding rods, respectively, such that a nozzle guides and shapes the melted portions of the first and second welding rods into contact with the melted portions of the first and second edges and the membrane, thereby heat-welding the portions of the first and second edges and portions of the first and second welding rods to the membrane. Furthermore, such a method may also comprise advancing the hot air along the remaining length of the first and second edges and additional portions of the first and second welding rods until the entire length of the first and second edges are welded to the membrane.

BRIEF DESCRIPTION OF THE DRAWINGS

FIG. 3 is a detailed view of an embodiment of a dual nozzle for use with the welder of FIG. 1.

DETAILED DESCRIPTION

Figure 1:
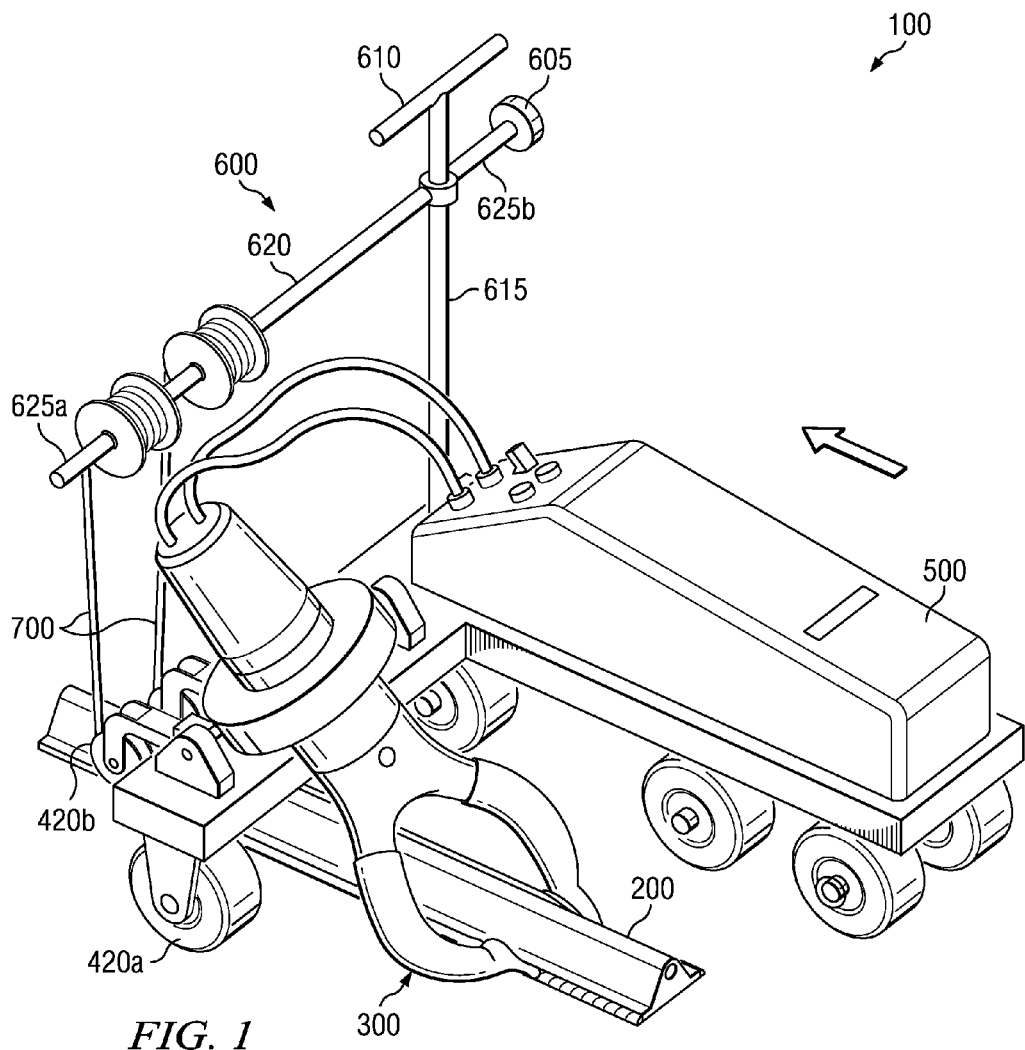
FIG. 1 is a schematic view of an embodiment of a dual welder for welding a thermoplastic profile strip to a thermoplastic roofing membrane.

A first exemplary embodiment of a dual welder 100 for welding a thermoplastic profile strip 200 to a thermoplastic roofing membrane is shown in FIG. 1. The dual welder 100 includes a split nozzle 300, a welder platform 400, a welder drive unit 500, a welding rod feed apparatus 600. Like numerals are used across the figures to describe similar parts of the dual welder 100.

Figure 1A:
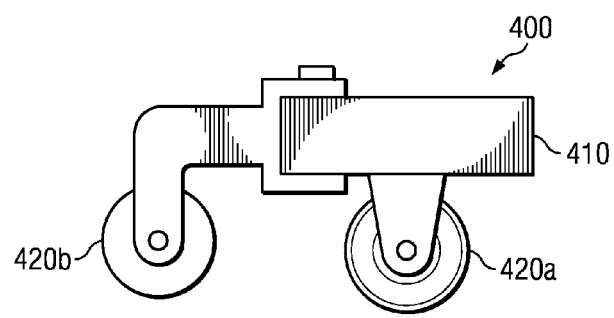

FIG. 1A is a side view of the welder platform 400. In one embodiment, the welder platform 400 includes a platform 410 and one or more wheels 420. In some embodiments, there is a first wheel 420a and a second wheel 420b. In some embodiments, there are a pair of first wheels 420a and a pair of second wheels 420b. In some embodiments, the pair of wheels 420a straddle the thermoplastic profile strip 200 while in others they do not. In some embodiments, the pair of wheels 420b straddle the thermoplastic profile strip 200 while in others they do not. The welder platform 400 may be shaped and sized by one of skill in the art to support the split nozzle 300, the welder 500, the welding rod feed apparatus 600, and associated parts. The welder 500 may be any commercially available welder for use in welding thermoplastic roofing material such as, but not limited to, Leister Varimat V, Sarnafil Sarnamatic and Forsthoff Forplast hot air welders. The welder platform 400 moves the split nozzle 300 and the welder 500 along the length of the thermoplastic profile strip 200. In an exemplary embodiment, the welder platform 400 supports the welder 500 and associated parts. In some embodiments, the welder platform 400 also moves and supports the welding rod feed apparatus 600. In some embodiments, the welder platform 400 may be self-propelled while in other embodiments the welder platform 400 may be manually propelled by an operator.

Figure 2A:
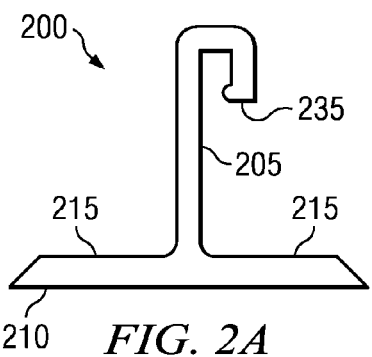
FIGS. 2A-2F are cross-sectional views of various embodiments of thermoplastic profile strips for use with a split nozzle.
Figure 2B:
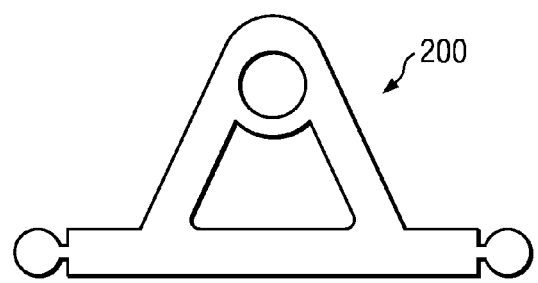
Figure 2C:
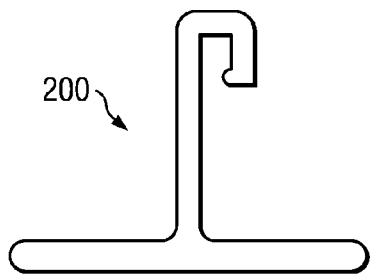
Figure 2D:
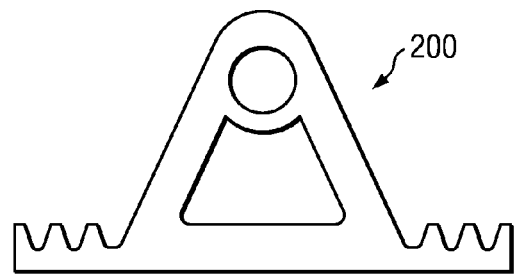
Figure 2E:
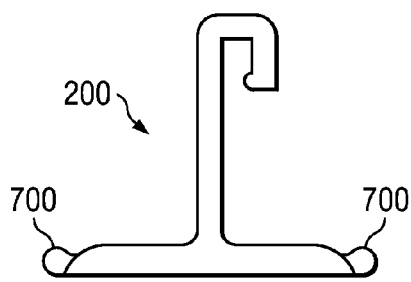
Figure 2F:
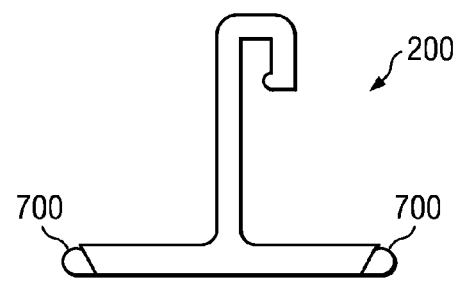
Figure 2G:
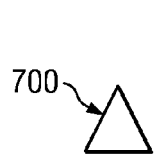
FIGS. 2G-2J are cross-sectional views of various embodiments of welding rods for use with a split nozzle.
Figure 2H:
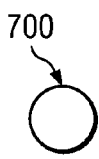
Figure 2I:
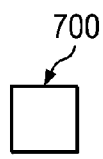
Figure 2J:
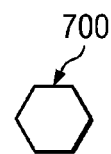
Figure 4:
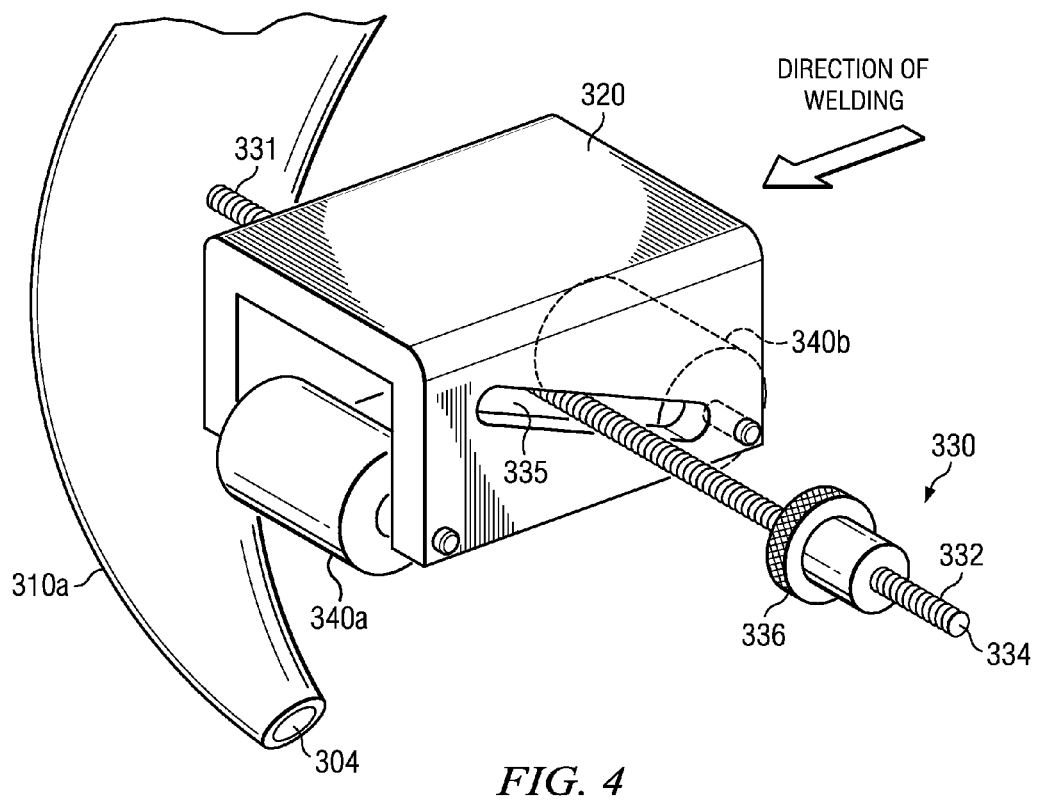
FIG. 4 is a detailed view of an embodiment of a housing for use with the dual welder of FIG. 1.

FIGS. 2A-2F shows various cross-sections of thermoplastic profile strips 200 which are contemplated for being welded to the thermoplastic membrane using the split nozzle 300 described. FIGS. 2A through 2D are cross-sectional profiles of the thermoplastic profile strip 200. In some embodiments, the cross-section of the thermoplastic profile strip 200 may be, but is not limited to, standing seam, batten seam or triangular. In some embodiments, the thermoplastic profile strip 200 may be hollow or solid. FIGS. 2E and 2F are cross-sectional profiles of various edges of the thermoplastic profile strip 200. In some embodiments, the cross-section of the edge of the thermoplastic profile strip 200 may be, but is not limited to, angled or tapered. FIGS. 2G-2J are cross-sectional profiles of various embodiments of a welding rod 700 for use with the split nozzle 300 described. In some embodiments, the cross-section of the welding rod 700 may be, but is not limited to, triangular, round, square, or hexagonal. In some embodiments, the welding rod 700 may be hollow or solid. The welding rod 700 may be made be made from, but is not limited to, polyolefin, PVC, polycarbonate, PET, nylon, polystyrene, ABS, copolymer, filled polymers (fillers such as talc, $CaCO_3$ etc.) or any other suitable thermoplastic or thermoset plastic. In some embodiments the welding rod 700 may be made of two dissimilar coaxial materials fused together, with the outer material amenable to welding having an inner harder core. In other embodiments, metal coated rods may be used with the welding rod 700 to provide strength.

Referring to FIG. 2A, an exemplary embodiment of the thermoplastic profile strip 200 is preferably produced as an integrally formed seamless thermoplastic object. Methods of production of the thermoplastic profile strip 200 may include extrusion, molding, etc. The thermoplastic profile strip 200 preferably includes an upstanding central portion 205 extending lengthwise along the strip and opposed flange portions 215 extending widthwise from the central portion 205. In some embodiments, the opposed flange portions 215 extend from the central portion 205 in the range from about 0.5 inch to about 1 inch, and in a more specific embodiment may be about ⅝ inch. The opposed flange portions 215 length may depend on the height of the upstanding central portion 205 that needs to be supported. In some embodiments, the upstanding central portion 205 height ranges from about 1 inch to about 3 inches, more preferably from about 2 inches to about 2.5 inches. In a more specific embodiment, the upstanding central portion 205 height is 1.25 inches. Opposite the upstanding central portion 205 and the opposed flange portions 215 is a bottom surface 210. In one embodiment, the bottom surface 210 is about ¾ inch. In other embodiments, the bottom surface 210 may range from about ⅛ inch to about 1 inch. In some embodiments, the bottom surface 210 may be coated with an adhesive. In some embodiments, the upper portion of the upstanding central portion 205 includes an integral hook 235. In an exemplary embodiment, the hook 235 has a cross section similar to an upside down U. In an alternate embodiment, the hook 235 may also include a lip.

Moreover, the thermoplastic profile strip 200 may be made from, but is not limited to, polyolefin, PVC, polycarbonate, PET, nylon, polystyrene, ABS, copolymer, filled polymers or any other suitable thermoplastic. More specifically, the specific composition of the thermoplastic strip 200 may be selected, perhaps even in combination with its selected cross-sectional profile design, to provide a rigid strip or a flexible strip. For example, exemplary rigid strips may be constructed of thermoplastic olefin, and may have a flexural modulus greater than about 70,000 p.s.i. per ASTM D790. Alternatively, exemplary flexible strip may be constructed of thermoplastic olefin, and may have a flexural modulus of less than about 50,000 p.s.i. per ASTM D790. Furthermore, the cross-sectional design of profile strips 200 may be coincide with the rigidity of the strip. For example, the profile strip 200 designs in FIGS. 2A, 2C, 2E and 2F may be better tailored for the higher (i.e., rigid) flexural modulus numbers since there is less rigidity provided be the actual design of the strip 200 structure. Conversely, the profile strips 200 in FIGS. 2B and 2D may be better tailored for the lower (flexible) flexural modulus numbers since there is more rigidity provided be the design of the strip 200 structure. However, no limitation to any particular cross-sectional design and flexible modulus range should be implied, and each application may have a different combination of design parameters.

Referring now to FIGS. 3-7, illustrating other exemplary embodiments, the split nozzle 300 includes a splitter 305, a pair of nozzles 310, a housing 320, a width adjuster 330, and one or more pressure devices 340, or combinations thereof. The splitter 305 preferably includes an inlet 301 and a plurality of outlets 302. In one embodiment, the splitter 305 is connected to the outlet of the welder 500. In some embodiments, the inlet 301 of the split nozzle 300 is rotatably connected to the welder 500 allowing the splitter 305 to rotate around the z-axis. In other embodiments, the splitter is also able to rotate about multiple axis. In an exemplary embodiment, the rotatable connection is a socket, including a swivel pin, for placing the splitter 305 onto the outlet of the welder 500, more preferably the socket is grooved to nest with the welder 500. Other methods of connecting the welder 500 and the splitter 305 would be understood by one skilled in the art. The outlets 302 are preferably connected to a first nozzle 310a and a second nozzle 310b. The welder 500 provides hot air to the splitter 305. The splitter 305 supplies hot air to the nozzles 310. The nozzles 310 supply hot air from the welder 500 to the welding rod 700, the thermoplastic profile strip 200 and the thermoplastic roofing membrane.

In exemplary embodiments, the splitter 305 is fabricated from pipe components, i.e., fittings. In an alternate embodiment, the split nozzle 300 is an integrally fabricated piping component. The sizing of the split nozzle 300 including the inlet 301 and the plurality of outlets 302 will be dependent on the sizing of the first nozzle 310a and the second nozzle 310b, which will be sized dependent on the thermoplastic profile strip 200. The splitter 305, inlet 301, outlet 302 may be any size, for example, but not limited to a diameter of about 1, 1.5, 2 or 3 inches. Although the splitter 305, inlet 301, outlet 302 are shown as having a circular cross-sectional shape, they may be of any cross-sectional shape such as, but not limited to, square, rectangular or polygonal.

Figure 5:
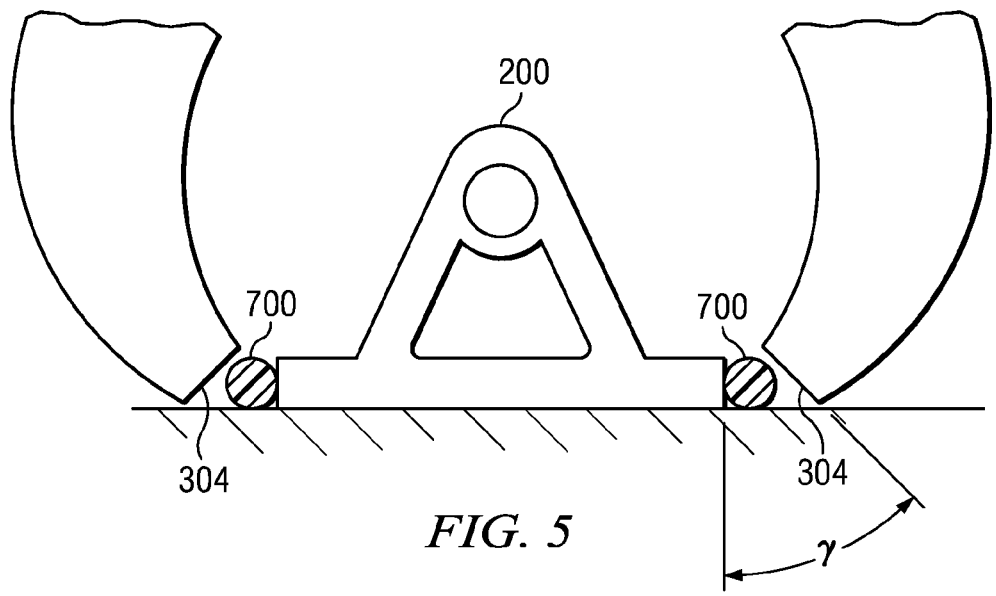
FIG. 5 is a detailed view of an embodiment of a nozzle end for use with the dual welder of FIG. 1.
Figure 5A:
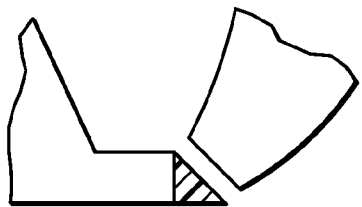
FIG. 5A is a detailed view of an embodiment of a nozzle end for use with the dual welder of FIG. 1.
Figure 5B:
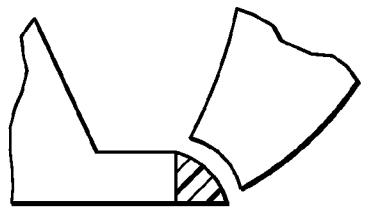
FIG. 5B is a detailed view of an embodiment of a nozzle end for use with the dual welder of FIG. 1.
Figure 5C:
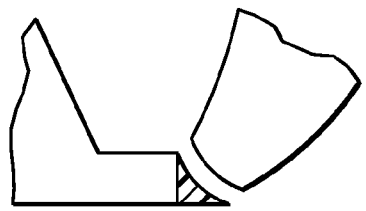
FIG. 5C is a detailed view of an embodiment of a nozzle end for use with the dual welder of FIG. 1.

The first nozzle 310a and the second nozzle 310b are substantially identical, therefore only the first nozzle 310a will be described. The first nozzle 310a includes an inlet 303 and an outlet 304. The inlet 303 will be connected to one of the outlets 302 of the splitter 305. The inlet 303 may be any size, for example, but not limited to a diameter of about 1, 1.5, 2 or 3 inches. In some embodiments, from the inlet 303 to the outlet 304, the first nozzle 310a is tapered and crescent-like. The outlet 304 delivers a hot air stream to the welding rod 700. In some embodiments, the outlet 304 is substantially lateral to the thermoplastic profile strip 200. The length of the outlet 304 may be may be any size, for example, but not limited to about 0.5, 0.75, 1, or 1.25 inches. The height of the outlet 304 may be may be any size, for example, but not limited to about 0.125 inches to about 0.5 inches. The shape of the outlet 304 will provide various shapes of the welding rod 700 after welding. The outlet 304 is preferably shaped and sized to provide a triangular or smooth bead of the welding rod 700 after welding. In some exemplary embodiments, the outlet 304 is about 5 to about 90 degrees off vertical. In other exemplary embodiments, the outlet 304 is about 45 degrees off vertical. FIG. 5 depicts the outlet 304 and the welding rod 700 prior to welding. FIGS. 5A, 5B, and 5C, depict embodiments of the shape of the outlet 304 and the type of seam they produce after welding including triangular, curved or concave. The cross section of the outlet 304 is preferably shaped to provide an even flow of hot air across welding rod 700. In some embodiments, the outlet 304 height may be adjustable.

Figure 6A:
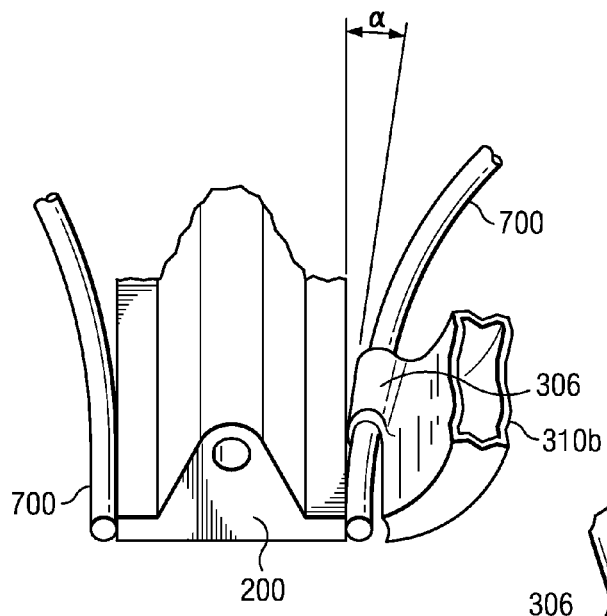
FIG. 6 is a detailed view of an embodiment of a rod guide for use with the dual welder of FIG. 1.
Figure 6B:
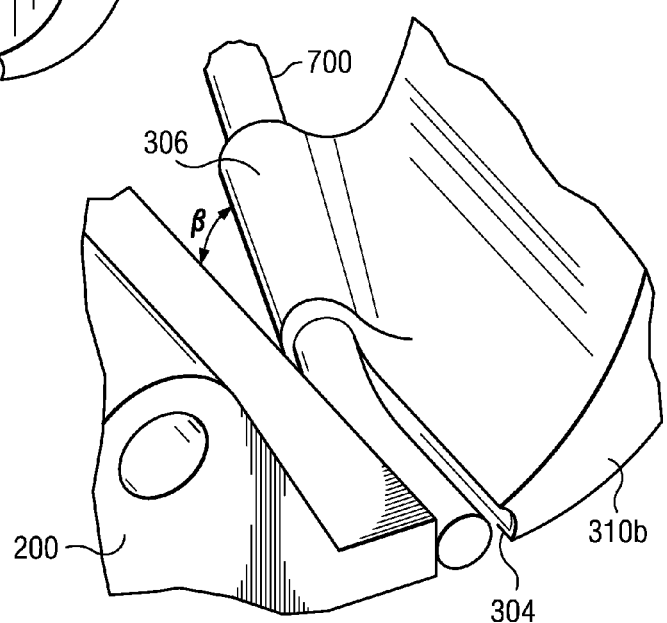
Figure 6C:
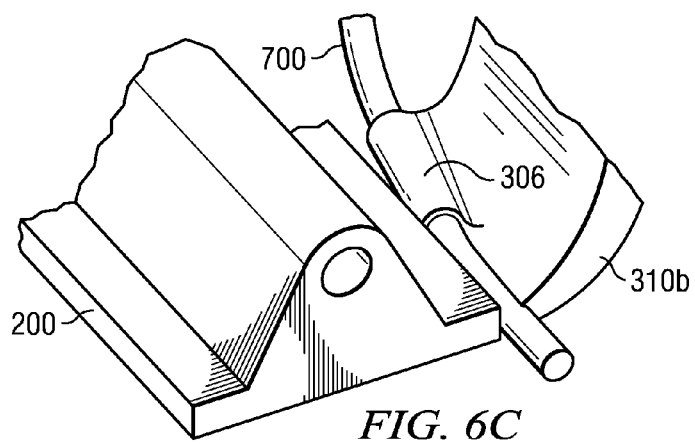

Referring to FIG. 6, in another exemplary embodiment, the first nozzle 310a may also include a tubular guide 306 for providing the welding rod 700 into position for welding the thermoplastic profile strip 200 and the thermoplastic roofing membrane together. In some embodiments, the guide 306 is adjacent to the outlet 304. In other embodiments, the guide 306 will be on an angle α ranging from about 0 to about 90 degrees off the horizontal axis and an angle β ranging from about 0 to about 90 degrees off the vertical axis. These offsets ensure the welding rod 700 will be properly placed for welding. In other embodiments, the guide 306 is optional and the pair of wheels 420b may be used to ensure the welding rod 700 will be properly placed for welding.

In advantageous embodiments, the first nozzle 310a and the second nozzle 310b are separated by a space to place the outlets 304 of each nozzle 310 on either side of the thermoplastic profile strip 200. In some embodiments, the space also accommodates the housing 320, the width adjuster 330 and the pressure devices 340. In an exemplary embodiment, the first nozzle 310a and the second nozzle 310b are connected by the width adjuster 330 which traverses the space between the two nozzles 310. In other embodiments, the width adjuster 330 is optional. In some embodiments, the width adjuster 330 is connected to the first nozzle 310a and the second nozzle 310b in a substantially horizontal position. In some embodiments, the width adjuster 330 is welded to the first nozzle 310a and the second nozzle 310b. In other embodiments, the width adjuster 330 is threaded onto the first nozzle 310a and the second nozzle 310b. In still other embodiments, the width adjuster 330 is a threaded rod 334 and a wheel 336. In other embodiments, the width adjuster 330 is a spring. The threaded rod 334 preferably has the wheel 336 threaded onto itself before being connected to the first nozzle 310a and the second nozzle 310b. In one embodiment, the wheel 336 is a knurled wheel. The threaded rod 334 includes a left end 331 and a right end 332. Outwardly from the wheel 336, the left end 331 is threaded with left-handed threads and connected to the first nozzle 310a of the split nozzle 300 and the right end 332 is threaded with right-handed threads and connected to the second nozzle 310b. The left end 331 may be threaded or welded to the first nozzle 310a of the split nozzle 300 and the right end 332 may be threaded or welded to the second nozzle 310b When the wheel 336 is turned clockwise from the point of view of a user standing facing it, the legs 310 are driven farther apart (FIG. 3B) and when the wheel 336 is turned counterclockwise, the nozzles 310 are drawn closer together (FIG. 3A). The housing 320 preferably rotatably supports the one or more pressure devices 340. In other embodiments, the one or more pressure devices 340 are optional. The housing 320 includes an adjustment slot 335 where the width adjuster 330 allows for application of pressure on the thermoplastic profile strip 200, ensuring contact between the thermoplastic roofing membrane and the thermoplastic profile strip 200. The length of the adjustment slot 335 may range from about 1 to about 2.25 inches. In some embodiments, the adjustment slot 335 is angled to allow the width adjuster 330 to rise or lower depending upon the adjustment being made by the width adjuster 330. In some embodiments, the angle of the adjustment slot 335 may depend on the height of the housing 320 and may range from about 0 degrees to about 45 degrees. In some embodiments, the width adjuster 330 may be any mechanism capable of adjusting the distance between the first nozzle 310a and the second nozzle 310b. In other embodiments, the width adjuster 330 is a spring capable of adjusting the width between the first nozzle 310a and the second nozzle 310b.

Figure 7A:
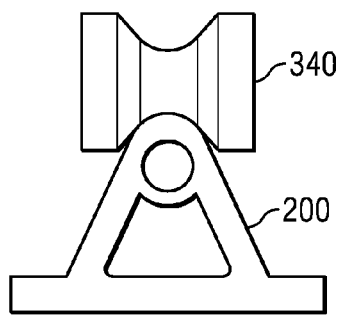
FIG. 7A is a schematic view of an embodiment of a pressure cylinder for use with embodiments of the dual welder.
Figure 7B:
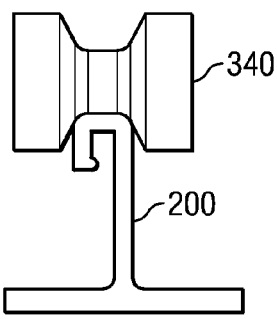
FIG. 7B is a schematic view of an embodiment of a pressure cylinder for use with embodiments of the dual welder.
Figure 7C:
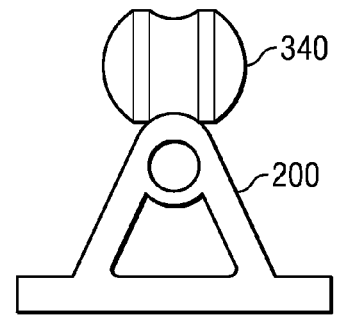
FIG. 7C is a schematic view of an embodiment of a pressure cylinder for use with embodiments of the dual welder.

In exemplary embodiments, the one or more pressure devices 340 are cylinders for applying pressure to the thermoplastic profile strip 200 while welding is occurring. In some embodiments, the one or more pressure devices 340 are rotatably connected to the housing 320. In some embodiments, the one or more pressure devices 340 are rotatably connected to the housing 320 using a rotating shaft-bearing pressure cylinder fitted onto the housing 320. In some embodiments, the housing 320 rests on the width adjuster 330 passing through the adjustment slot 335. In other embodiments, the one or more pressure devices 340 are rotatably connected to the first nozzle 310a and the second nozzle 310b. The pressure devices 340 may be any weight that will provide enough pressure to seal the weld without damaging the thermoplastic profile strip 200 or the thermoplastic roofing membrane. In some embodiments, the pressure is provided by the adjustment slot 335 and is independent of pressure devices 340 weight. The pressure devices 340 may be steel, Teflon or any material with a smooth surface and low friction. In some embodiments, there is a forward pressure device 340a which sits forward of the width adjuster 330. In other embodiments, there is also a rearward pressure device 340b which sits aft of the width adjuster 330. The pressure devices 340 are capable of being raised or lowered dependent upon the height of the thermoplastic profile strip 200. In some embodiments, the adjustment slot 335 locks in place and applies pressure via the pressure device 340 over the thermoplastic profile strip 200. Referring to FIG. 7, various shapes of the pressure devices 340 are contemplated for use with the dual welder 100. The shape of the pressure device 340 may be, but is not limited to, smooth (FIG. 7), tapered (FIG. 7A), stepped (FIG. 7B) or grooved (FIG. 7C) and will preferably be chosen to complement the cross-section of the thermoplastic profile strip 200 to provide optimal contact between the thermoplastic profile strip 200 and the pressure device 340. In an exemplary embodiment, the pressure devices 340 may be self-aligning. In other embodiments, the one or more pressure devices 340 are any mechanism capable of applying an even pressure to the thermoplastic profile strip 200 as the split nozzle 300 traverses the length of the thermoplastic profile strip 200.

In some embodiments, the welding rod feed apparatus 600 is connected to the welder platform 400. The welding rod feed apparatus 600 includes one or more spools of welding rod 700, a counterweight 605, and a handle 610. The handle 610 may include a longitudinal segment 615 which attaches the handle to the welder platform 400. The handle 610 may also have a lateral segment 620 for providing spools of welding rod 700 on a first end 625a and the counterweight 605 on an opposite second end 625b. the welding rod feed apparatus 600 may be any of those known to one skilled in the art or manufactured by one skilled in the art. The welding rod feed apparatus 600 may be any apparatus capable of providing the welding rod 700 to the guide 306 of the split nozzle 300. In some embodiments, the counterweight 605 is optional. In some embodiments, the welding rod 700 is guided by the wheels 420b FIG. 1A and passes through the guide 306.

In some embodiments, when the guides 306 are used, the welding rod 700 may be loosely fed from the welding rod feed apparatus 600, under the wheels 420b, or just by laying the welding rod 700 along the length of the thermoplastic profile strip 200. The guides 306 allow greater freedom in how the welding rod 700 is fed/laid to the welding locations along the edges of the thermoplastic profile strip 200. However, if guides 306 are not used, then the welding rods 700 could be laid along the length of the thermoplastic profile strip 200 prior to the welder 500 being moved along the thermoplastic profile strip 200. This could be done with the wheels 420 shown in FIG. 1, or the welding rod 700 could just be laid all along the length of the thermoplastic profile strip 200 prior to the welder 500 being moved along the thermoplastic profile strip 200.

Figure 8:
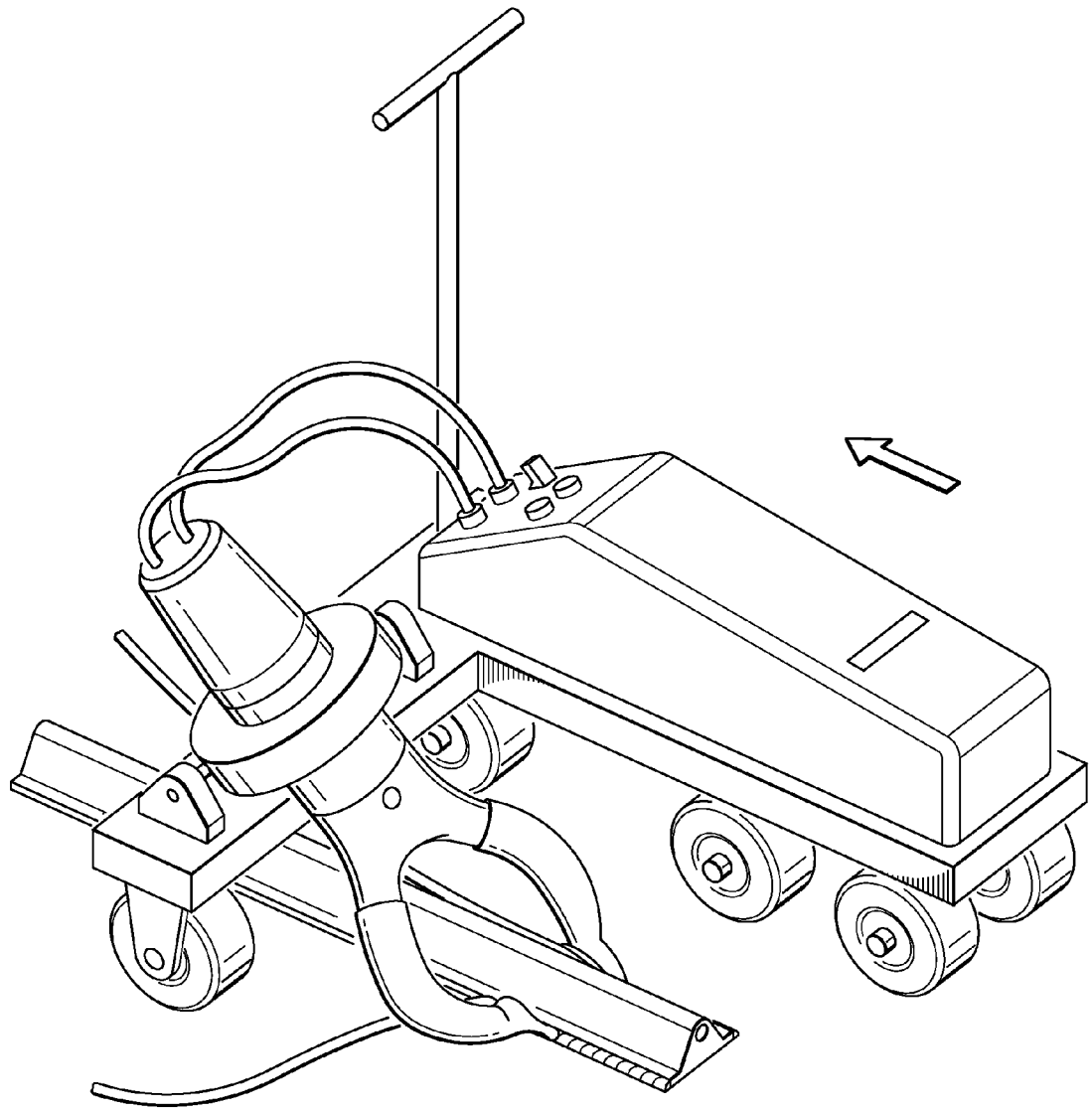
FIG. 8 is a schematic view of an alternate embodiment of a dual welder for welding a thermoplastic profile strip to a thermoplastic roofing membrane.

Referring to FIG. 8, in an alternate embodiment, the dual welder 100 is similar to the one shown in FIG. 1, except the welding rod 700 is loose laid, and thus not fed from the welding rod feed apparatus 600 shown in the embodiment of FIG. 1. In such embodiments, the nozzles of the welder may not include the guides discussed above since the thermoplastic welding rods may be laid along the longitudinal edges of the profile strip. In other respects, the apparatus illustrated in FIG. 8 is substantially similar, and operates as such, as the embodiment illustrated in FIG. 1.

Figure 9:
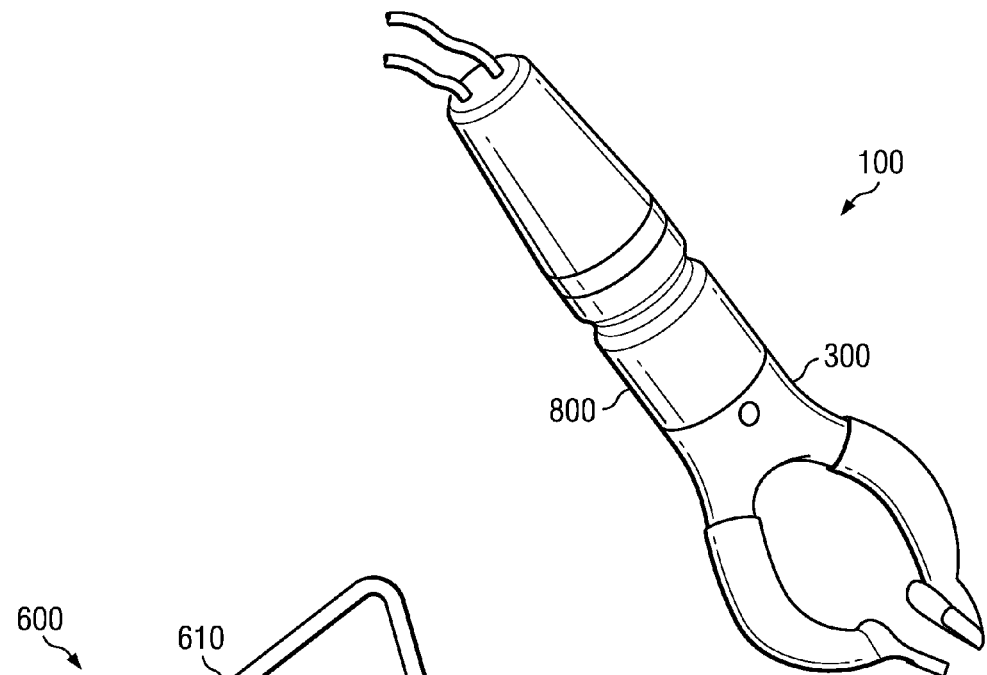
FIG. 9 is a schematic view of an alternate embodiment of a dual welder for welding a thermoplastic profile strip to a thermoplastic roofing membrane.

Referring to FIG. 9, in another embodiment, the split nozzle 300 attached to a hand held welder 800. The split nozzle 300 is connected to the outlet of the handheld welder 800. In some embodiments, the split nozzle 300 does not have the housing 320, the width adjuster 330, or the one or more pressure cylinders 340. In some embodiments, the operator will choose a split nozzle 300 having the appropriate width, dependent upon the thermoplastic profile strip 200 being welded. In some embodiments, the split nozzle 300 may not be rotatably connected to the hand held welder 800. The hand held welder 800 may be any of those known to one skilled in the art.

Figure 10:
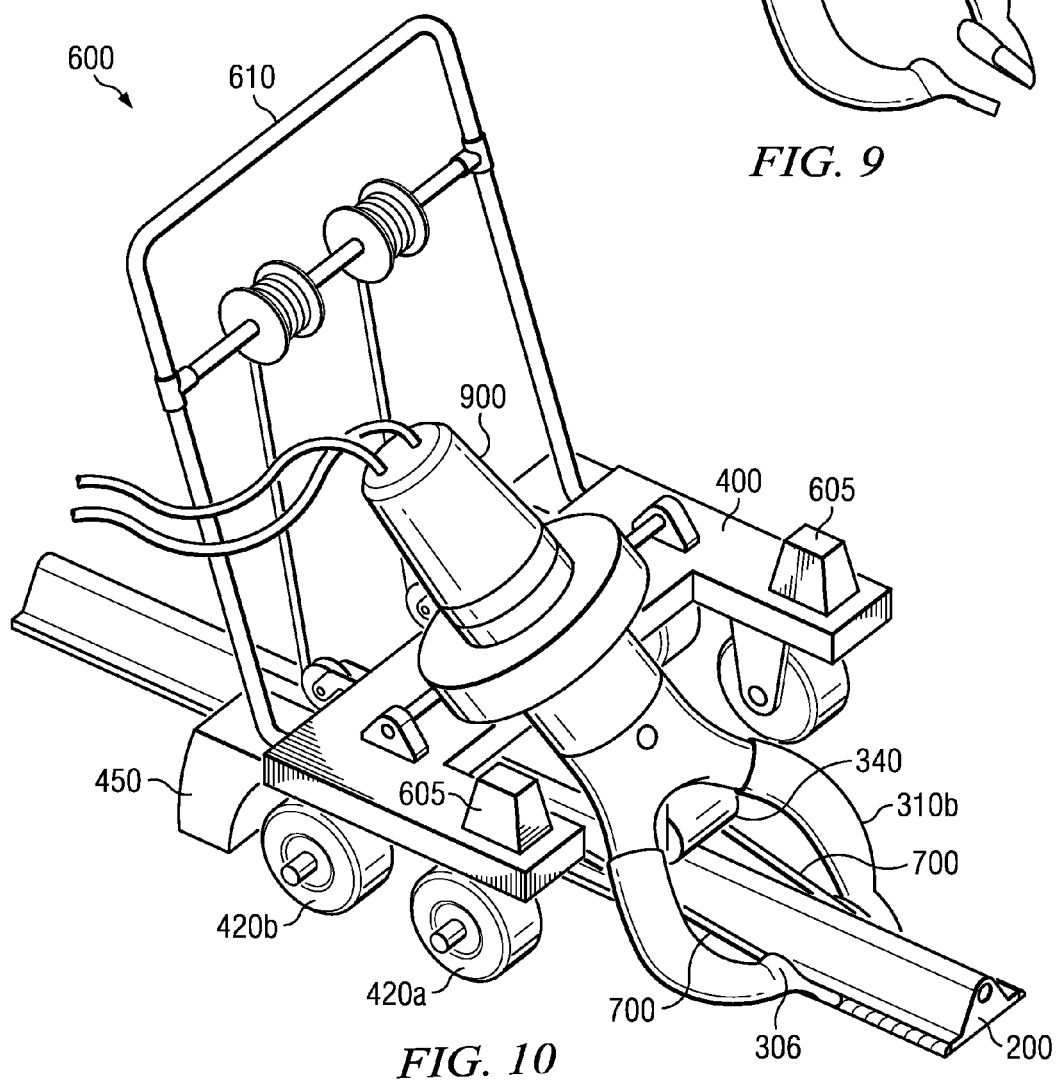
FIG. 10 is a schematic view of an alternate embodiment of a dual welder for welding a thermoplastic profile strip to a thermoplastic roofing membrane.

Referring to FIG. 10, an alternate embodiment of the dual welder 100 is an integrated split nozzle and welder 900. In some embodiments, the integrated split nozzle and welder 900 is width adjustable, rotatable and combinations thereof. In some embodiments, the integrated split nozzle and welder 900 is a combination of all the features of the split nozzle 300 and the hand held welder 800. In other embodiments, the split nozzle 300 includes all the features described above or combinations thereof. In yet other embodiments, the integrated split nozzle and welder 900 is a combination of all of the features of the hand held welder 800 with the split nozzle 300 without the housing 320 and the width adjuster 330. In some embodiments, the split nozzle 300 may be rotatable about all axes. In further embodiments, the split nozzle 300 includes the width adjuster 330. The one or more pressure devices 340 may be connected to the first nozzle 310a and the second nozzle 310b in a substantially horizontal rotatable method.

The welder platform 400 is modified to suspend the integrated split nozzle and welder 900 over the thermoplastic profile edge 200 with the first nozzle 310a and the second nozzle 310b being on either side of the thermoplastic profile edge 200. In some embodiments, the integrated split nozzle and welder 900 is rotatably connected to the welder platform 400. The welder platform 400 is connected to the welding rod feed apparatus 600 by attachment of a handle 610. The handle 610 includes the lateral segment 620 for providing spools of welding rod 700. The welder platform 400 may also include a drive mechanism 450 which will propel the welder platform 400 and its associated parts along the thermoplastic profile edge 200 for welding. The platform 410 of the welder platform 400 includes space for providing counterweights 605 on it.

To weld the thermoplastic profile strip 200 to the thermoplastic membrane, the first nozzle 310a and the second nozzle 310b may be positioned as shown in FIGS. 1, 3, 7 and 9. The outlets 304 and guides 306 are properly positioned by use of a properly sized split nozzle 300 or by adjustment of the width adjuster 330. The welder 500, 800, or 900 is propelled along the thermoplastic profile strip 200 causing the welding rod 700 to melt and weld the thermoplastic profile 200 to the thermoplastic roofing membrane. In some embodiments, the welder 500, 800, or 900 may be automatically propelled or manually propelled by the operator or the welder platform 400.

In some embodiments, before the thermoplastic profile strip 200 is welded to the thermoplastic roofing membrane, the thermoplastic profile strip 200 may be temporarily attached to the thermoplastic roofing membrane in straight parallel lines using an adhesive 125.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R.1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of welding a thermoplastic profile strip to a thermoplastic membrane, the method comprising:
   a) placing a thermoplastic profile strip on a thermoplastic membrane, the profile strip having a horizontal base extending longitudinally, and a first longitudinal edge and a second longitudinal edge opposite the first edge, wherein the thermoplastic membrane is in close proximity to the first and second longitudinal edges;
   b) placing a first thermoplastic welding rod along a portion of the first longitudinal edge, and placing a second thermoplastic welding rod along a portion of the second longitudinal edge;
   c) simultaneously directing hot air along the portion of the first longitudinal edge and along the portion of the second longitudinal edge, the directing simultaneous with the placing of the first and second thermoplastic welding rods, wherein the hot air sufficiently softens the portions of the first and second edges and the first and second welding rods such that gravity brings the softened portions of the first and second edges and softened portions of the first and second welding rods into contact with the membrane thereby heat-welding the portions of the first and second edges and the portions of the first and second welding rods to the membrane; and
   d) advancing the hot air along the remaining length of the first and second edges and additional portions of the first and second welding rods until the entire length of the first and second edges are welded to the membrane.

2. The method of claim 1, further comprising applying downward pressure to the profile strip during the directing of the hot air to the portions.

3. The method of claim 2, wherein applying downward pressure comprising rolling pressure rollers on a vertical central portion laterally connected to an upper surface of the horizontal base of the profile strip.

4. The method of claim 3, wherein rolling pressure rollers on top of the vertical central portion of the profile strip occurs immediate after the directing of the hot air along the portions of the first and second edges and the portions of the first and second welding rods.

5. The method of claim 1, wherein the thermoplastic profile strip comprises primarily thermoplastic olefin.

6. The method of claim 5, wherein the thermoplastic welding rods olefin comprise primarily thermoplastic olefin.

7. The method of claim 5, wherein the thermoplastic olefin has a flexural modulus greater than about 70,000 p.s.i. per ASTM D790.

8. The method of claim 5, wherein the thermoplastic olefin has a flexural modulus of less than about 50,000 p.s.i. per ASTM D790.

9. The method of claim 1, wherein the placing further comprises adhering the thermoplastic profile strip to the membrane prior to the directing of the hot air above and below the first and second edges.

10. The method of claim 1, wherein advancing the hot air along the remaining length of the first and second edges and the first and second welding rods is manually done.

11. The method of claim 1, wherein advancing the hot air along the remaining length of the first and second edges and the first and second welding rods is automatically done.

12. The method of claim 1, wherein placing the first welding rod along the first longitudinal edge and placing the second welding rod along the second longitudinal edge is manually done through corresponding first and second guides.

13. The method of claim 1, wherein placing the first welding rod along the first longitudinal edge and placing the second welding rod along the second longitudinal edge is automatically done through corresponding first and second guides.

14. An apparatus for welding a thermoplastic profile strip to a thermoplastic membrane, the apparatus comprising:
- a) a first nozzle configured to direct hot air along a portion of a first longitudinal edge of a horizontal base of a thermoplastic profile strip placed on a thermoplastic membrane;
- b) a second nozzle configured to direct hot air along a portion of a second, opposing longitudinal edge of the thermoplastic profile strip; and
- c) a tubular splitter configured to simultaneously supply hot air to the first nozzle and the second nozzle, wherein the first and second nozzles further comprise corresponding guides for placing thermoplastic welding rods along the first and second longitudinal edges of the thermoplastic profile strip proximate to the portions of the first and second edges receiving the hot air simultaneously.

15. The apparatus of claim 14, further comprising:
- d) one or more pressure rollers adjustably connected to the first and second nozzles and configured to press the thermoplastic profile strip down against the membrane during the hot air applied above and below the first edge and the second, opposing edge of the thermoplastic profile strip.

16. The apparatus of claim 14, further comprising a hot air supply to supply hot air to the tubular splitter.

17. The apparatus of claim 16, wherein the first nozzle and second nozzle are rotatably connected to the hot air supply.

18. The apparatus of claim 16, further comprising a platform for supporting the apparatus and the hot air supply.

19. The apparatus of claim 16, wherein a width between the first nozzle and second nozzle is adjustable.

20. The apparatus of claim 17, further comprising means for feeding the thermoplastic welding rods to the guides.

21. The apparatus of claim 17, wherein the first nozzle and second nozzle are adjustably separated.

22. The apparatus of claim 17, wherein each of the guides are on an angle of about 0 degrees off the vertical axis of the apparatus and about 90 degrees off the horizontal axis of the apparatus.

23. The apparatus of claim 17, wherein the guides are connected to outputs of the first and second nozzles directed to provide the simultaneous hot air to the portions of the first and second edges, wherein front ends of the guides are configured to feed the thermoplastic welding rods directly in front of the corresponding outputs and where the portions of the first and second edges are proximate to the thermoplastic membrane.

24. The apparatus of claim 23, wherein an angle of a longitudinal axis of each guide is adjustable with respect to each guide's corresponding output.

* * * * *